(12) United States Patent
Robitschko

(10) Patent No.: US 6,550,461 B2
(45) Date of Patent: Apr. 22, 2003

(54) INTERNAL COMBUSTION ENGINE

(75) Inventor: Reinhard Robitschko, Jenbach (AU)

(73) Assignee: Jenbacher Aktiengesellschaft, Jenbach (AT)

( * ) Notice: Subject to any disclaimer, the term of this patent is extended or adjusted under 35 U.S.C. 154(b) by 0 days.

(21) Appl. No.: 09/976,810

(22) Filed: Oct. 12, 2001

(65) Prior Publication Data

US 2002/0092509 A1 Jul. 18, 2002

(30) Foreign Application Priority Data

Oct. 12, 2000 (AU) .................................. A 1731/2000

(51) Int. Cl.[7] .................................................. F02B 53/00
(52) U.S. Cl. ........................ 123/564; 123/563; 60/611
(58) Field of Search ................................ 123/563, 564, 123/559.1; 60/611, 399, 39.11

(56) References Cited

U.S. PATENT DOCUMENTS

| 3,577,726 | A | * | 5/1971 | Wagner | 60/599 |
| 4,821,520 | A | * | 4/1989 | Rumfield | 60/614 |
| 5,173,021 | A | * | 12/1992 | Grainger et al. | 60/611 |
| 5,203,309 | A | * | 4/1993 | Goto et al. | 123/564 |
| 5,347,972 | A | * | 9/1994 | Sandou et al. | 123/564 |
| 5,375,565 | A | * | 12/1994 | Maxson et al. | 123/198 D |
| 5,964,086 | A | * | 10/1999 | Kraemer | 60/39.11 |

FOREIGN PATENT DOCUMENTS

| DE | 42 15 046 A2 | 11/1993 |
| EP | 0 068 517 A1 | 1/1983 |
| EP | 0 468 676 A1 | 1/1992 |
| EP | 1 008 736 A2 | 6/2000 |
| JP | 411311500 A | * 11/1999 |

* cited by examiner

*Primary Examiner*—Thomas Denion
*Assistant Examiner*—Thai-Ba Trieu
(74) *Attorney, Agent, or Firm*—Lorusso Loud & Kelly LLP

(57) ABSTRACT

Internal combustion engine (8), in particular a stationary gas engine, with a bypass (6) going around the super-charger (4), in which at least one detonation protector (11) is arranged.

5 Claims, 3 Drawing Sheets

FIG. 3

INTERNAL COMBUSTION ENGINE

BACKGROUND OF THE INVENTION

The present invention relates to an internal combustion engine, in particular a stationary gas engine with a super-charger and a bypass going around the super-charger.

In four-stroke gas engines with fuel/air mixture supercharging, uncontrolled ignition of the mixture can occur in the mixture lines. The mixture located in the region between the air intake and inlet valves is burned rapidly (flashing, deflagration, detonation, explosion and so forth). Engine components can be destroyed in this way. The combustion finds a way out in the region of the engine block, or in the area of the inlet valves. The combustion flame front then travels along the paths provided by the mixture lines. However, in the case of four-stroke engines with superchargers, there can be damage to the super-charger and other components in particular when the combustion flame front reaches the super-charger directly via the bypass. In order to prevent this accidental flashing or burning, a so-called—detonation protector is used. In DE 19856993 A1 a detonation protector is used directly in front of each valve of the gas driven combustion engines. This flash protection arrangement has the disadvantage, however, that the degree of efficiency of the internal combustion engine is reduced.

SUMMARY OF THE INVENTION

The object of the invention is to arrange a detonation protector in the mixture lines such that no additional reduction of the degree of efficiency of the internal combustion engine is caused.

The internal combustion engine according to the invention is characterised in that at least one detonation protector is arranged in the bypass.

By means of this arrangement according to the invention of a detonation protector, the super-charger and other components are effectively protected when accidental flashes or fires occur in the bypass. Furthermore, by means of the arrangement of the detonation protector in the bypass, no significant power loss is caused in the internal combustion engine.

The effectiveness of the detonation protector is improved in particular in that the bypass is provided, in the area of the detonation protector, with a widened cross-section. By means of this enlarged effective cross-section, on the one hand improved heat dissipation is obtained when flashing occurs, and on the other hand the gas flow is less badly obstructed because of the larger flow cross-section.

A central feature of the internal combustion engine according to the invention is in that a mixture cooler is connected after the super-charger. Apart from its main purpose as indicated by its name, the mixture cooler also has the function of a detonation protector in the main combustion gas mixture line. This additional function is provided by the large surface area within the mixture cooler. By means of the arrangement according to the invention of the detonation protector in the bypass and of the mixture cooler in the main mixture line, an effective flash protection for the entire system is provided without also producing a disadvantage reduction in the degree of efficiency of the internal combustion engine.

A particularly simple variation in terms of construction provides that the detonation protector is provided with at least one grid. Alternatively, the detonation protector can have at least two grids, preferably arranged in crossing relationship. These grids must be fabricated from material that has good heat conduction, in particular metal. By means of this flash protection configuration, effective protection of the internal combustion engine from damage by accidental flashing is obtained.

BRIEF DESCRIPTION OF THE DRAWINGS

Further features and details of the present invention will be apparent from the following description of the drawings in which.

DETAILED DESCRIPTION OF THE INVENTION

Figure 1:
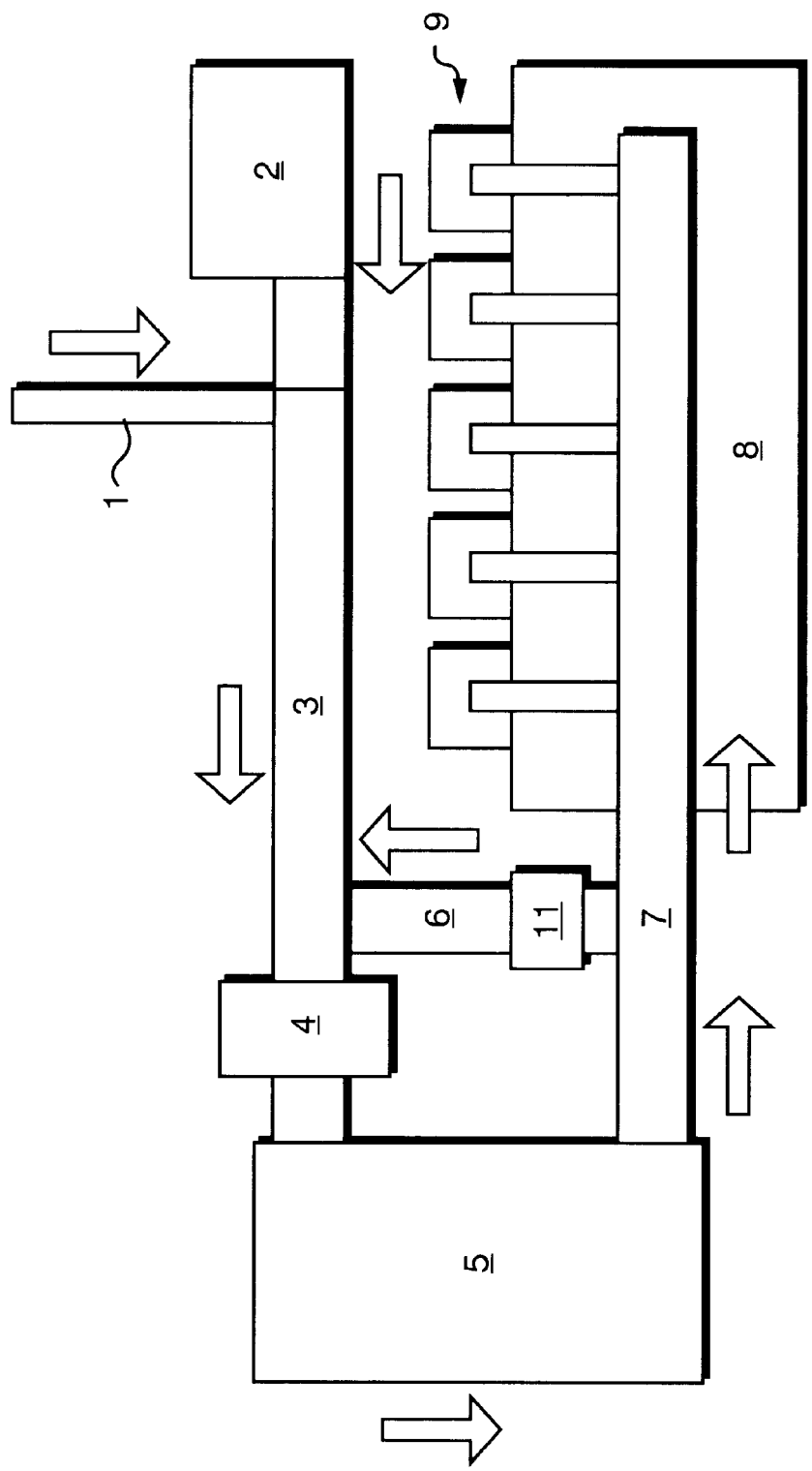
FIG. 1 is an internal combustion engine according to the invention, shown schematically.

In the internal combustion engine shown in FIG. 1, air 2 is mixed with the combustible gas 1 and fed in the mixture supply line 3 to the super-charger 4. The fuel-air mixture then flows through the mixture cooler 5 into the mixture supply line 7 to the engine block 8 with the inlet valves 9. After the mixture cooler 5, excess mixture is then fed back to the mixture line 3 in front of the super-charger 4 via the bypass 6. The detonation protector 11 is arranged according to the invention in the bypass 6.

If unwanted flashing phenomena now occur in the area of the engine block 8 or the inlet valves 9, they now spread out along the mixture line 7 in the direction of the mixture cooler 5 and bypass 6. By means of the detonation protector 11 according to the invention, the spreading flash is effectively halted and the super-charger 4 and the other components of the engine connected ahead are protected from damage by accidental flashing.

Figure 2:
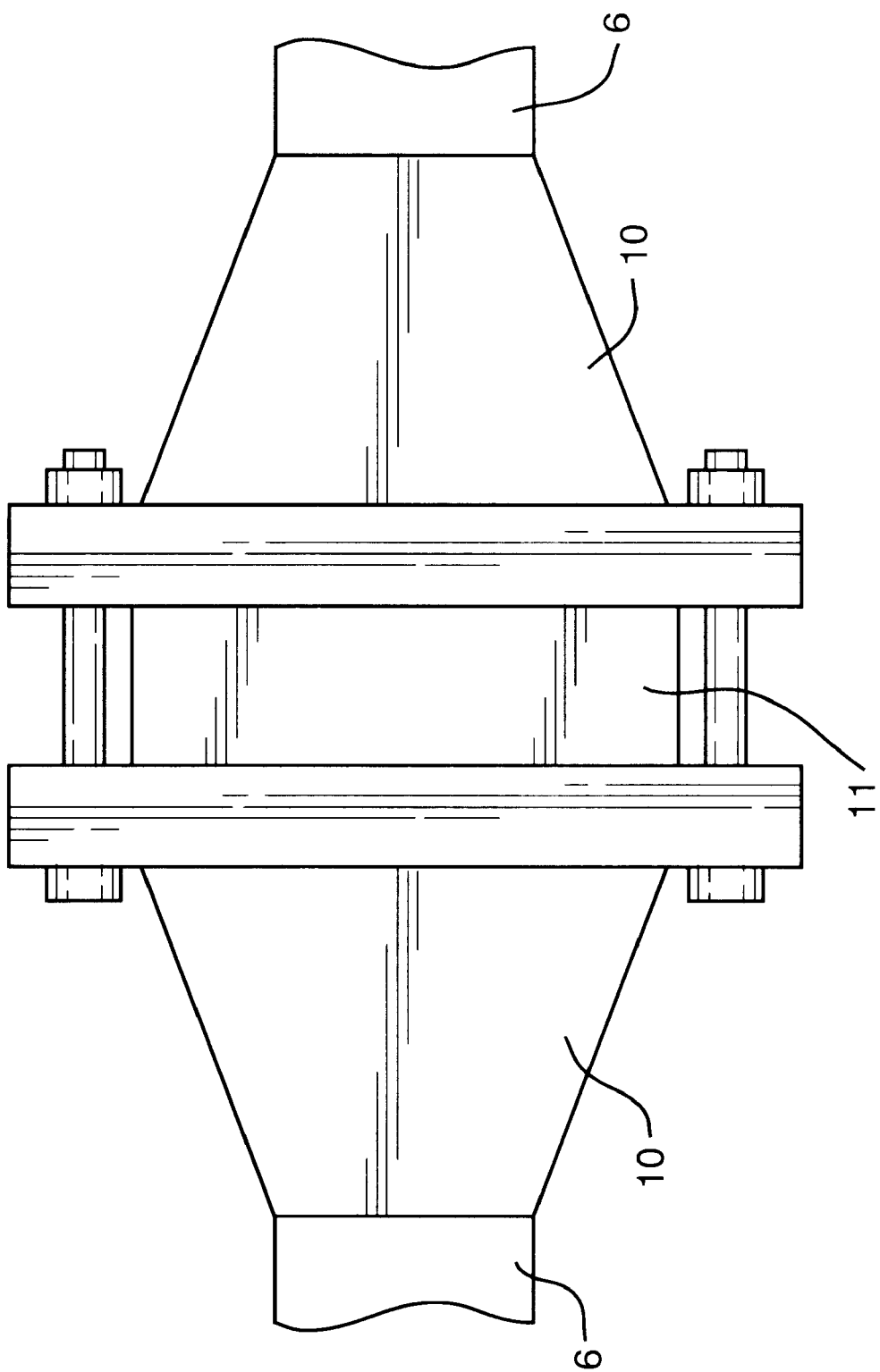
FIG. 2 is a side view of the widened cross-section of the bypass in the area of the detonation protector.

FIG. 2 shows a variation to the configuration of the widened cross-section of the bypass 6 in the area of the detonation protector 11. The detonation protector 11 is arranged between two conical tube pieces 10. The widening of the bypass 6 is obtained by means of these conical tube pieces 10.

Figure 3:
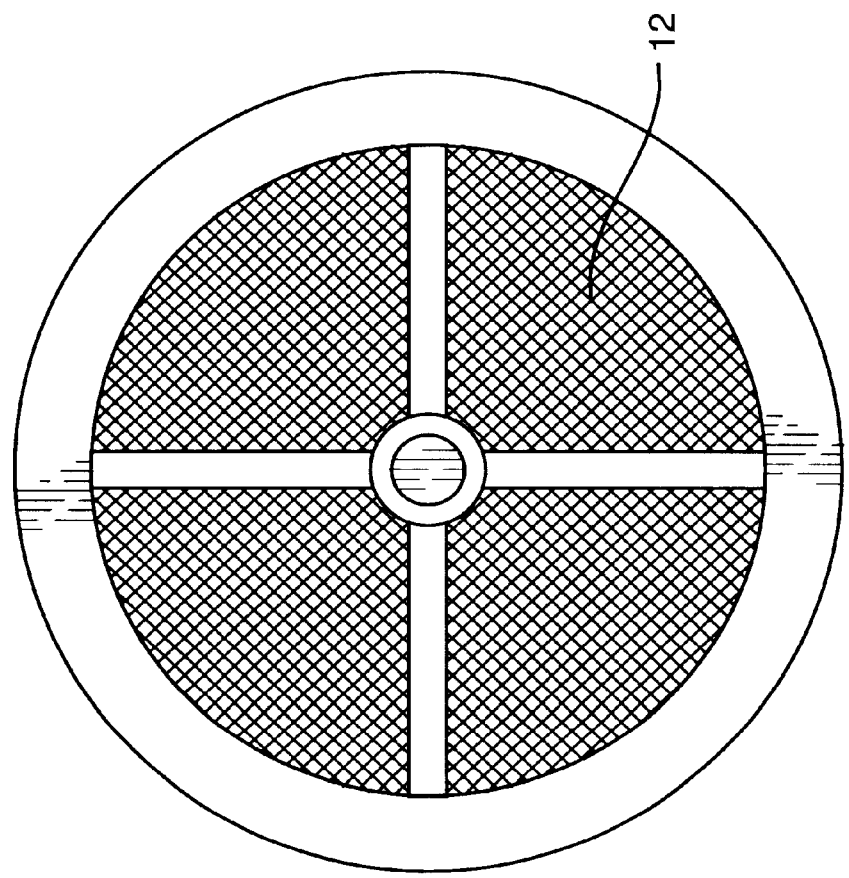
FIG. 3 is a schematic plan view of a grid in a horizontal position.

FIG. 3 shows the grid made from good heat conducting material, preferably metal, which halts an oncoming flash front by means of rapid heat dissipation.

Figure 4:
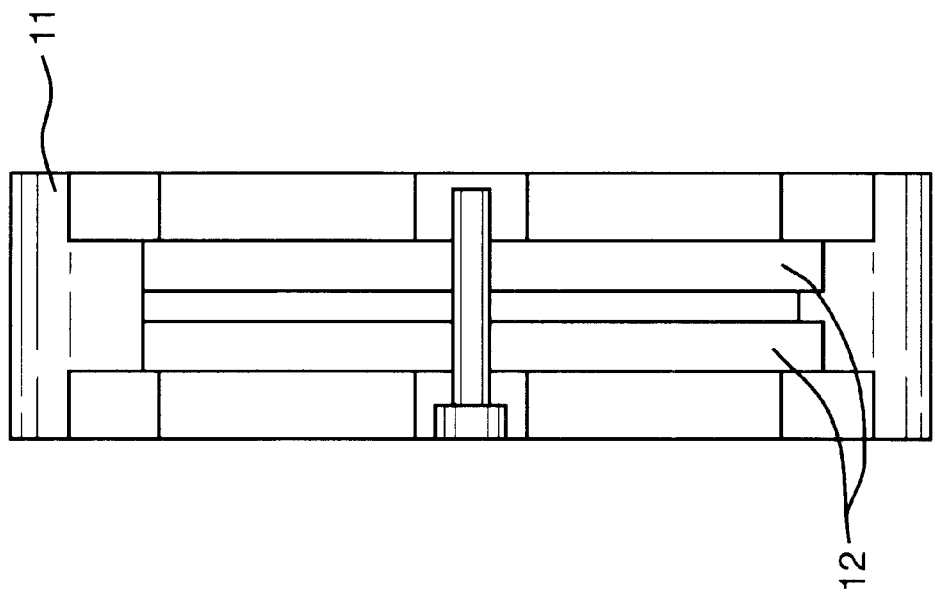
FIG. 4 is a schematic view from the side of the detonation protector with two grids arranged therein.

In the side view in FIG. 4, two grids 12 are shown arranged in crossing relationship in the detonation protector 11.

What is claimed is:

1. An internal combustion engine comprising:
    a first mixture supply line for delivering a combustile air-gas-mixture to a super-charger;
    a mixture cooler downstream the super-charger;
    a second mixture supply line directing the combustible air-gas-mixture out of the mixture cooler;
    a bypass going around the super-charger thereby connecting the first and the second mixture supply lines; and
    at least one detonation protector arranged in the bypass.
2. The internal combustion engine of claim 1, wherein the bypass has a widened cross-section in the area of the detonation protector.
3. The internal combustion engine of claim 1, wherein the detonation protector is provided with at least one grid.
4. The internal combustion engine of claim 1, wherein the detonation protector has at least two grids preferably arranged in crossing relationship.
5. The internal combustion engine of claim 1, wherein the internal combustion engine is a stationary gas engine.

* * * * *